(12) United States Patent
Meierhofer

(10) Patent No.: US 7,137,461 B2
(45) Date of Patent: Nov. 21, 2006

(54) MASONRY DRILLING TOOL

(75) Inventor: Markus Meierhofer, Passau (DE)

(73) Assignee: Black & Decker, Inc., Newark, DE (US)

( * ) Notice: Subject to any disclaimer, the term of this patent is extended or adjusted under 35 U.S.C. 154(b) by 246 days.

(21) Appl. No.: 10/674,195

(22) Filed: Sep. 29, 2003

(65) Prior Publication Data

US 2004/0112647 A1 Jun. 17, 2004

(30) Foreign Application Priority Data

Oct. 3, 2002 (GB) .................................. 0222901.1

(51) Int. Cl.
*E21B 17/22* (2006.01)
(52) U.S. Cl. .................................. 175/323; 175/420.1
(58) Field of Classification Search ........ 175/323–324, 175/394–395
See application file for complete search history.

(56) References Cited

U.S. PATENT DOCUMENTS

| | | | |
|---|---|---|---|
| 2,370,706 A | 3/1945 | Andreasson | |
| 4,549,616 A | 10/1985 | Rumpp et al. | |
| 4,579,180 A | 4/1986 | Peetz et al. | |
| 4,787,464 A | 11/1988 | Ojanen | |
| 4,932,815 A | 6/1990 | Krauss | |
| 4,967,855 A | 11/1990 | Moser | |
| 5,265,688 A * | 11/1993 | Rumpp et al. | 175/394 |
| 5,487,434 A * | 1/1996 | Obermeier | 175/323 |
| 5,492,187 A | 2/1996 | Neukirchen et al. | |
| 5,553,682 A | 9/1996 | Batliner et al. | |
| 5,893,688 A | 4/1999 | Wiker et al. | |
| 6,032,749 A | 3/2000 | Bongers-Ambrosius et al. | |
| 6,129,162 A | 10/2000 | Hauptmann | |
| 6,250,857 B1 | 6/2001 | Kersten | |
| 6,427,789 B1 | 8/2002 | Fuss et al. | |
| 6,702,047 B1 * | 3/2004 | Huber | 175/427 |
| 6,742,610 B1 * | 6/2004 | Peetz | 175/420.1 |

FOREIGN PATENT DOCUMENTS

| | | |
|---|---|---|
| DE | 803291 | 4/1951 |
| DE | 1 608 358 | 12/1970 |
| DE | 2 057 892 | 6/1972 |
| DE | 2 159 728 | 6/1973 |
| DE | 71 33 712 | 11/1973 |

(Continued)

*Primary Examiner*—Frank S. Tsay
(74) *Attorney, Agent, or Firm*—Harness, Dickey & Pierce, P.L.C.

(57) ABSTRACT

A masonry or rock drilling tool suitable for use with a rotary hammer has a drilling head (4, 104) at a forward end of the tool. A forwardly extending cutting plate (6, 106) is fitted or formed on the drilling head (4, 104). First and second opposing axially extending channels (36, 38, 136, 138) are formed on the circumferential periphery of the drilling head. The tool has a clamping shank (2, 102) at a rearward end of the tool suitable for fitment within a tool holder of a rotary hammer. An intermediate helical conveying portion (10, 110) extends between the drilling head and the clamping shank. The intermediate helical conveying portion has at least four helically extending flutes (14*a–d*, 114*a–d*) separated by corresponding helically extending webs (12*a–d*, 112*a–d*). The first of the axially extending channels extend axially rearwardly from a forward facing face of the drilling head into two of the four flutes. The second of the axially extending channels extend axially rearwardly from the forward facing face of the drilling head into the other two of the four flutes. Conveying properties of the tool are substantially enhanced by having each axially extending channel leading into two of the four flutes.

38 Claims, 4 Drawing Sheets

FOREIGN PATENT DOCUMENTS

| | | |
|---|---|---|
| DE | 23 58 447 | 3/1975 |
| DE | 80 10 468 | 12/1981 |
| DE | 195 37 900 A1 | 4/1997 |
| DE | 197 03 994 A1 | 8/1998 |
| DE | 19727070 | 1/1999 |
| DE | 19753731 | 6/1999 |
| DE | 198 59 885 | 11/1999 |
| DE | 200 21 710 U1 | 4/2001 |
| DE | 201 00 085 | 5/2001 |
| EP | 0 088 037 | 9/1983 |
| EP | 0 126 409 | 5/1984 |
| EP | 0 363 734 | 9/1989 |
| EP | 0 654 580 | 9/1994 |
| EP | 0 655 547 | 9/1994 |
| EP | 0 657 617 | 10/1994 |
| EP | 0 657 617 B1 | 1/1996 |
| GB | 183005 | 7/1922 |
| GB | 1 362 292 | 8/1974 |
| GB | 1 432 546 | 4/1976 |
| GB | 1579332 | 11/1980 |
| JP | 63-89211 | 4/1988 |
| WO | WO 99/29998 | 6/1999 |
| WO | WO 200166899 A2 * | 9/2001 |

* cited by examiner

MASONRY DRILLING TOOL

CROSS-REFERENCE TO RELATED APPLICATION

This application claims priority to United Kingdom Patent Application No. 0222901.1 filed Oct. 3, 2002, which application is herein expressly incorporated by reference.

FIELD OF THE INVENTION

This invention relates to a drilling tool for a rotary hammer, in particular to a masonry or rock drilling tool.

BACKGROUND OF THE INVENTION

Masonry drilling tools generally comprise a drill head provided with a carbide cutting plate, and optionally side cutting plates and a single-start or multi-start spiral conveying helix, which adjoins the drill head. At the end of the conveying helix remote from the drill head is generally provided a clamping shank which can be releasably fixed within a tool holder of a rotary hammer. Such masonry drilling tools are generally driven by a rotary hammer which can simultaneously apply a rotational drive to the drilling tool and repeated axial impacts to the rearward end of the drilling tool.

In masonry drilling tools, the primary function of the conveying helix is to convey the drilled hole material, such as dust and chippings, broken away by the carbide cutting plate out of the hole. It is important to the performance of the drilling tool that a large volume of broken material, such as dust and chippings, is conveyed out of the drilled hole because this aids the advancement of the drilling tool into the drilled hole. Good material conveying properties also help to prevent jamming of the drilling tool within the drilled hole, which jamming can damage the drilling tool and the rotary hammer driving the drilling tool. The life of the drilling tool is also improved if it has good material conveying properties. The conveying helix also performs the function of guiding the drilling tool within the drilled hole.

The conveying helix generally comprises one or more discharge grooves or flutes which extend helically around the drilling tool. Each of the flutes is bounded on each side by a corresponding helically extending web. Each web has a conveying surface which faces in the direction of the clamping shank of the tool along which broken material is conveyed. The radially outwardly facing surface of the webs guides the drilling tool within the drilled hole.

There are a number of proposals for improving the conveying properties of the conveying helix, for example WO99/29998, which advocates the use of auxiliary webs and/or flutes in addition to the primary webs and flutes of a drilling tool.

Critical to the conveyance of broken material out of the drilled hole is the conveyance of broken material from the carbide cutting plate at the forward facing face of the drill head, where the broken material is generated to the entrances to the flutes of the conveying helices. For this purpose a plurality of substantially axially extending channels are generally formed around the drill head for transporting broken material from the cutting plate or plates to the entrances to the flutes of the conveying helices. This has been addressed, for example in EP657,617 and DE197 03 994 in which relatively high volume channels are provided for this purpose. Also, DE195 37 900 and DE200 21 710 propose improved designs of such channels.

SUMMARY OF THE INVENTION

The present invention provides an improved design of a drilling tool which significantly improves the cutting performance of the drilling tool. Also, the invention provides the conveyance of broken material from the forward end of the drilling head to the forward entrances of the flutes of the conveying helices.

According to a first aspect of the present invention, a masonry or rock drilling tool suitable for use with a rotary hammer comprises a drilling head at a forward end of the tool. A forwardly extending cutting plate is fitted or formed on the drilling head. First and second opposing axially extending channels are formed on the circumferential periphery of the drilling head. A clamping shank is at a rearward end of the tool and is suitable for fitment within a tool holder of a rotary hammer.

An intermediate helical conveying portion extends between the drilling head and the clamping shank. The intermediate helical conveying portion comprises at least four helically extending flutes separated by corresponding helically extending webs.

The cutting plate is formed with a central chiselling dome and a pair of cutting edges extending radially outwardly from the chiselling dome. Each cutting edge has a trailing relief face. The acute angle between the relief face and the longitudinal axis of the tool varies from the radially inner portion to the radially outer end of each cutting edge. Accordingly, the angle increases from the radially inner portion to the radially outer portion of the cutting edge.

The first axially extending channel extends axially rearwardly from a forward facing face of the drilling head into a plurality of the at least four flutes. The second axially extending channel extends axially rearwardly from the forward facing face of the drilling head into a different plurality of the at least four flutes.

By using the identified cutting plate, the cutting action of the tool generates a high volume of broken material. Each of the axially extending channels, which extend rearwardly from the forwardly facing face of the drill head, feed into more than one of the flutes of the helical conveying portion of the tool. The broken material conveying properties of the tool are sufficient to remove the broken material generated by the cutting plate. Accordingly, the configuration of the channels supports the cutting action of the cutting plate. The interface between the axially extending channels and the flutes maintain a relatively high volume through which broken material can be transported. The webs, which separate the flutes into which each channel extends, facilitates the conveyance of broken material rearwardly from the channels. In order to facilitate this transportation of broken material by the rearwardly facing conveying surfaces of the webs, the webs, that separate the pluralities of flutes into which each channel extends, may terminate in a location circumferentially central of the associated axially extending channel.

There may be four flutes and four webs formed on the helical conveying portion of the drilling tool arranged so that the first axially extending channel extends into two of the four flutes. The second axially extending channel extends into the remaining two of the four flutes. In this case, the conveyance of broken material can be improved if the webs, that separate the pairs of flutes into which each channel extends, terminate in a location circumferentially central of the associated axially extending channel.

The cutting plate may be formed of a carbide material and may extend transversely across the drilling head. The first channel is formed to a first side of the cutting plate and the second channel is formed to a second opposite side of the cutting plate. Each cutting edge may form a boundary between a respective cutting face (43,143) and a respective trailing relief face (46,146) of the cutting plate. The acute angle between the cutting face and the longitudinal axis of the tool may vary along the cutting edge, for example by increasing from the radially inner portion to the radially outer portion of the cutting edge. The dome may be elliptical with the major axis of the elipse extending substantially parallel to the cutting edges of the cutting plate.

In order to provide sufficient volume for the transportation of broken material while maintaining the strength of the drill head, both axially extending channels may together extend over between 34% and 70% of the circumferential surface of the drilling head. For larger diameter tools, for example over around 16 mm diameter tools, this range is preferably between 40% and 60%. Also, the axially extending channels may have bases with a diameter of between 40% and 85% of the diameter of the drilling head. For larger diameter tools, for example over around 16 mm diameter tools, this range is preferably between 40% and 60%.

The surfaces of the channels may be formed so that they extend substantially parallel to the longitudinal axis of the tool. The channels may be concave in order to provide sufficient volume for the transportation of broken material while maintaining the strength of the drilling head.

Auxiliary cutters, for example of a carbide material, may be fitted or formed at the forward end of the drilling head to improve the cutting performance of the drilling head. For example, an auxiliary cutter may trail each cutting edge of the cutting plate in the direction of rotation. In this case, additional broken material can be transported rearwardly if an additional auxiliary axially extending channel is formed on the circumferential periphery of the drill head between each auxiliary cutter and the cutting edge of the cutting plate trailed by the auxiliary cutter. Thus, each auxiliary channel extends axially from the forward facing face of the drill head into at least one of the at least four flutes.

The webs may all have the same diameter. Accordingly, each of the webs may be formed with a radially outwardly facing surface to guide the drilling tool within a drilled hole. Alternatively, the webs may include at least two primary webs and at least two auxiliary webs of reduced diameter compared to the primary webs. Here, the primary webs may each be formed with a radially outwardly facing surface to guide the drilling tool within a drilled hole. The secondary webs may come to a point at their radially outer ends. To achieve better broken material conveying properties, the webs, that separate the pluralities of flutes into which each channel extends, terminate at a location circumferentially central of the associated axially extending channel. The webs have rearwardly facing broken material conveying surfaces. The webs, including the aforementioned primary or auxiliary webs, may have conveying surfaces which extend substantially perpendicularly to the longitudinal axis of the tool.

According to a second aspect of the present invention, a masonry or rock drilling tool suitable for use with a rotary hammer comprises a forwardly extending cutting plate fitted or formed at a drilling head at a forward end of the tool. First and second opposing axially extending channels are formed at the circumferential periphery of the tool. A clamping shank is at a rearward end of the tool. The shank is suitable for fitment within a tool holder of a rotary hammer.

An intermediate helical conveying portion extends between the drilling head and the clamping shank. The conveying portion comprises at least four helically extending flutes separated by corresponding helically extending webs. The first axially extending channel is concave and extends axially rearwardly from a forward facing face of the drilling head into a plurality of the at least four flutes. The second axially extending channel is concave and extends axially rearwardly from the forward facing face of the drilling head into a different plurality of the at least four flutes.

The broken material conveying properties of the tool are significantly enhanced by ensuring that the axially extending channels, which extend rearwardly from the forwardly facing face of the drill head, are concave and each feed into more than one of the flutes of the helical conveying portion of the tool. The concave channels provide sufficient volume for the transportation of broken material while maintaining the strength of the drilling head.

The second aspect of the present invention may include the same auxiliary features as described above with relation to the first aspect of the present invention. In particular a drilling tool according to the second aspect of the present invention may include the design of the cutting plate described above in relation to the first aspect of the present invention.

Further areas of applicability of the present invention will become apparent from the provided detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
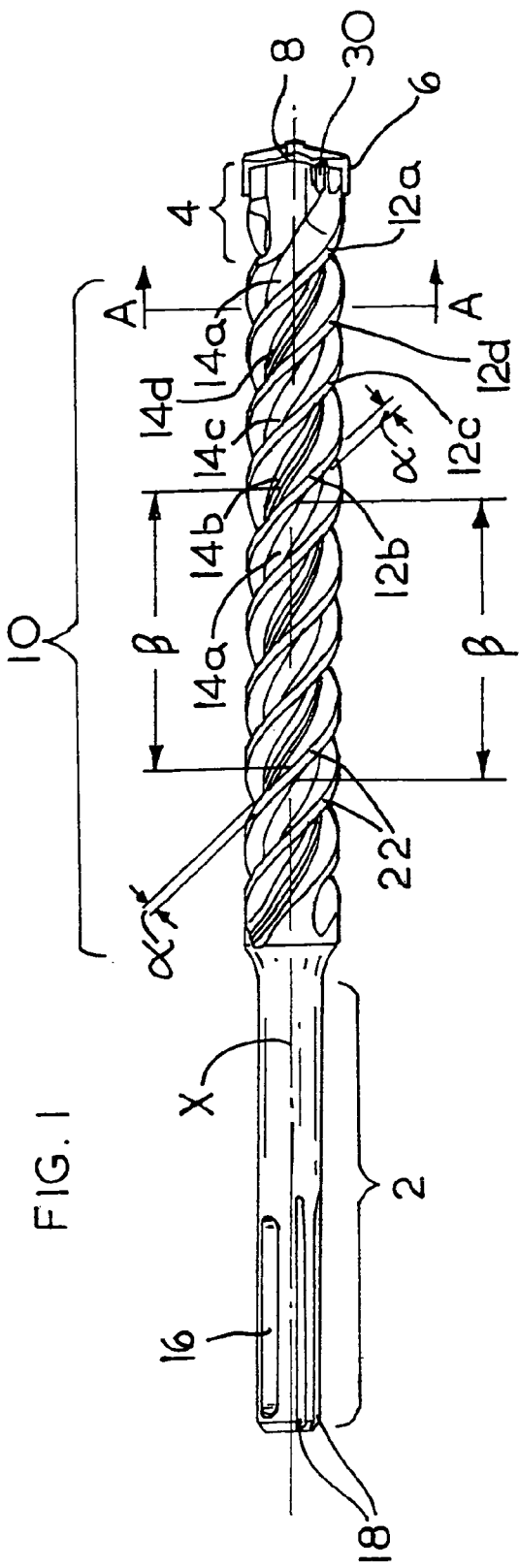
FIG. 1 shows a perspective view of a drilling tool according to a first embodiment of the present invention.
Figure 3:
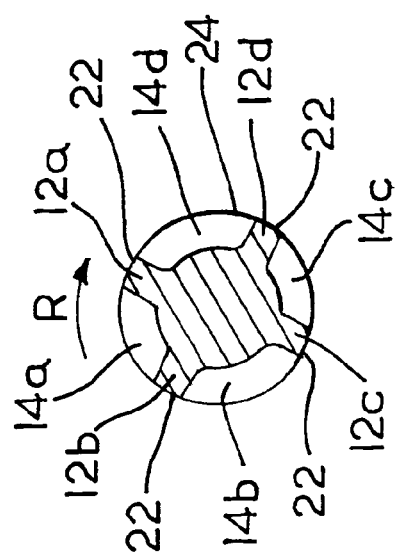
FIG. 3 shows a transverse cross-section through section A—A of FIG. 1.

The following description of the preferred embodiment(s) is merely exemplary in nature and is in no way intended to limit the invention, its application, or uses.

FIGS. 1 to 6 show a first design of a drilling tool according to the present invention. This form of the drilling tool is especially suitable for tools having diameters of between 16 mm and 40 mm. The tool has a clamping shank portion (2) at its rearward end which can be releasably fitted within a tool holder of a rotary hammer. The tool has a drilling head (4) at its forward end. A primary carbide cutting plate (6) and a pair of auxiliary carbide cutting tips (30) are mounted in a drilling head (4). The tool has an intermediate helical conveying portion (10) extending between the clamping shank portion (2) and the drilling head (4). Four helical webs (12a–d) and corresponding helical flutes (14a–d) extend around the clamping shank portion (2). The drilling tool of FIG. 1 has a nominal diameter of 30 mm.

The clamping shank of the tool shown in FIG. 1 is configured as an SDS-Max clamping shank, which is well known in the art. The shank comprises a pair of opposing axially closed grooves (16) which receive locking elements of a tool holder of a rotary hammer. This enables limited reciprocation of the drilling tool with respect to the tool holder. In addition the shank is formed with three axially extending slots (18). Each is open at its rearward end which terminates at the rearward end of the shank portion (2). Two of the three open slots (18) are shown in FIG. 1. The third slot (not shown) is formed on the opposite side of the shank portion (2) to the two slots shown. When the drilling tool is fitted within a tool holder of a rotary hammer, corresponding splines formed on the tool holder engage the open slots (18) to transmit rotary drive from the tool holder to the drilling tool.

The conveying helical portion (10) of the drilling tool comprises four discharge grooves or flutes (14a–d). The flutes (14a–d) extend helically around the drilling tool with a pitch β of 80 mm per rotation. Each of the flutes (14a–d) is bounded on each side by a corresponding helically extending web (12a–d). Each web has a conveying surface (20) which faces in the direction of the clamping shank of the tool. Each web extends in a direction substantially perpendicular to the longitudinal axis of the drilling tool, along which broken material is conveyed. The radially outwardly facing surface (22) of the webs guide the drilling tool within the drilled hole. The diameter of the webs is 27 mm and the diameter of the bases of the flutes is 15.5 mm. Opposing flutes (14a and c), together, extend circumferentially over 36% and opposing flutes (14b and d), together, extend circumferentially over 45% of the outer circumference (24) of the helical conveying portion of the drilling tool. The radially outer surface (22) of each web extends over 4.75% of the outer circumference (24) of the helical conveying portion of the drilling tool, which corresponds to a web width α of 4.06 mm.

Figure 2:
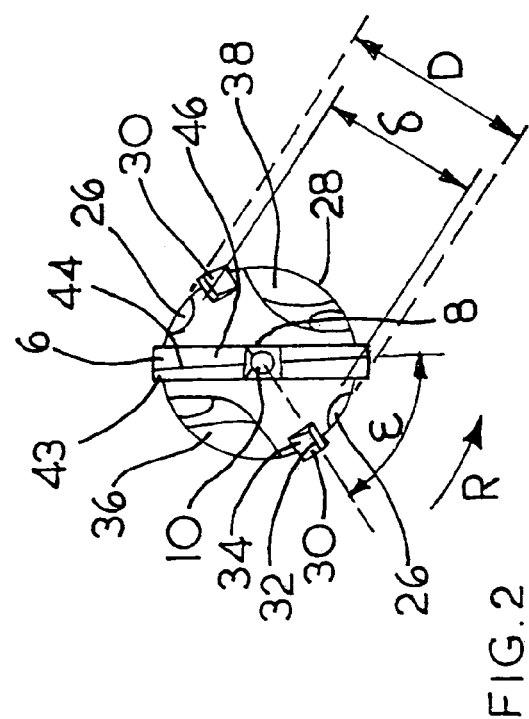
FIG. 2 shows a view of the forward end of the drilling tool of FIG. 1.
Figure 4:
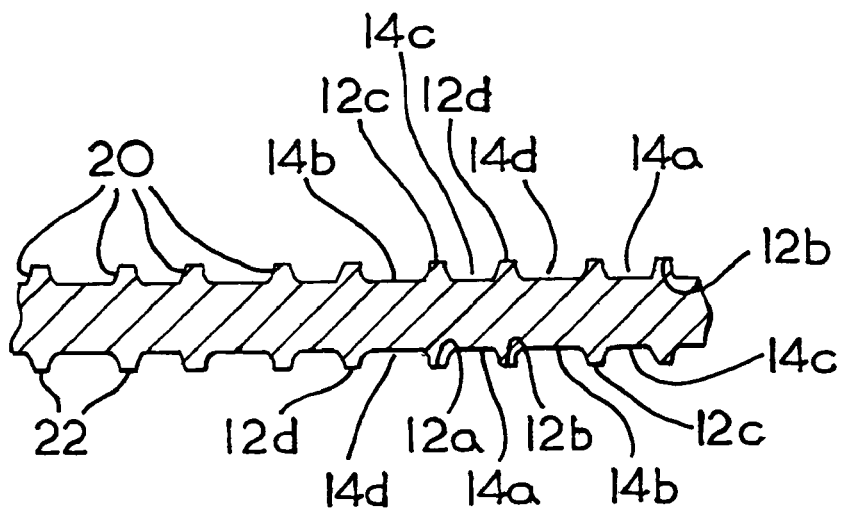
FIG. 4 shows a longitudinal cross-section through the helical conveying portion of the drilling tool of FIG. 1.
Figure 5:
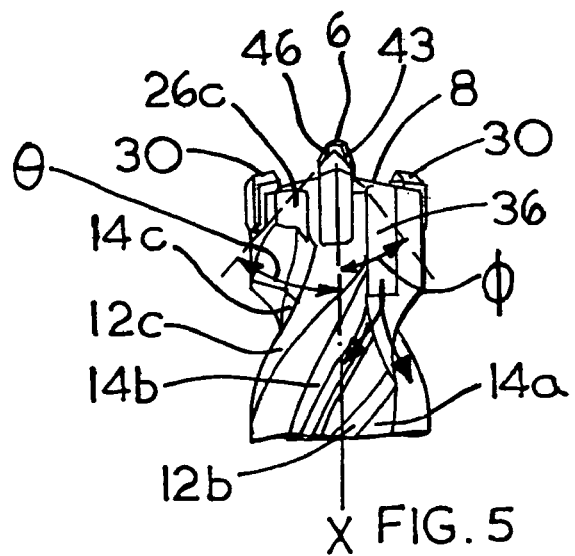
FIG. 5 shows a first perspective view of the drilling head of the drilling tool of FIG. 1.
Figure 6:
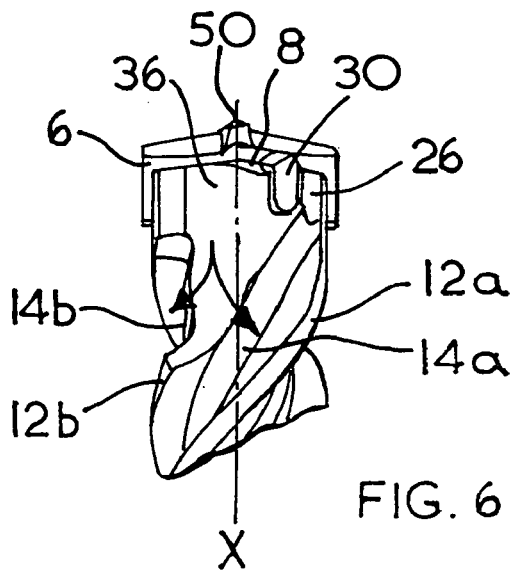
FIG. 6 shows a second perspective view of the drilling head of the drilling tool of FIG. 1.

The drilling head is best understood from FIGS. 2, 5 and 6. The drilling head is formed with a transverse slot within which is fixed, for example by braising, a carbide cutting plate (6). The drilling head has a diameter D of 27 mm. The cutting plate (6) extends axially beyond the forward facing face (8) of the drilling head and radially beyond both ends of the transverse slot in the drilling head to a diameter of 30.46 mm.

The two portions of the drilling head trailing the cutting plate (6) in the direction of rotation (R) are each formed with a secondary axially extending channel (26a, 26c). The secondary channels (26a, 26c) extend from the forward face (8) of the drilling head to an entrance of a respective flute (14a, 14c), as can be seen in FIGS. 5 and 6. The base of each secondary channel (26a, 26c) has a diameter δ of 23 mm and each secondary channel extends circumferentially over 6.5% of the circumference (28) of the drilling head.

The two portions of the drilling head trailing the secondary channels (26a, 26c) in the direction of rotation are formed with substantially radially extending slots open at their radially outer end and closed at their radially inner end. An auxiliary cutting tip or plate (30) is fitted within each of the slot by braising. The auxiliary cutting plates (30) extend radially outwardly to the same diameter as the cutting plate (6). The auxiliary cutting plates are axially recessed with respect to the cutting plate (6). Each auxiliary cutting plate (30) trails the cutting plate (6) in the direction of rotation (R) by an angle ε of 56°. Each auxiliary plate (30) has a cutting edge (32) and a trailing flank portion (34).

The two portions of the drilling head trailing the auxiliary plates (30) in the direction of rotation (R) are each formed with concave primary axially extending channels (36, 38). The first primary channel (36) extends from the forward facing face (8) of the drilling head to the entrance of two of the four flutes (14a, 14b). The second primary channel (38) extends from the forward facing face of the drilling head to the entrance of the remaining two of the four flutes (14c, 14d). Each channel (36, 38) extends over 22.75% of the circumference (28) of the drilling head. This means that both channels together extend over 45.5% of the circumference (28) of the drilling head. This percentage may be varied within the range of 40% to 60%. The diameter of the base of each channel is 13.58 mm, which is approximately 50% of the diameter of the drilling head. This percentage may be varied within the range of 40% to 60%. Accordingly, each primary channels (36, 38) is of sufficient volume to efficiently convey broken material from the forward face (8) of the drilling head to the entrances to two of the four flutes of the drilling tool. The concave shape of the channels (36, 38) provides a high volume for broken material removal while maintaining the strength of the drilling head. This arrangement, whereby each primary channel (36, 38) conveys broken material into two flutes, greatly improves the conveying of broken material from the forward face (8) of the drilling head to the conveying flutes (14a–d). This significantly reduces the incidence of blockages and improves the ease at which the drilling tool advances into a drilled hole. The channels (36, 38) have radially outwardly facing surfaces which are parallel to the longitudinal axis (X) of the drilling tool. The circumferential positioning of the channels (36, 38) on the drilling head is selected so that each channel, as it extends axially rearwardly intersects two of the flutes (14a–d) and so extends smoothly into two of the flutes (14a–14d). The arrows in FIGS. 5 and 6 show the transportation of broken material from the primary channel (36) into the flutes (14a) and (14b).

The web (12b) lies between the two flutes (14a and b) into which the channel (36) extends. The web (12b) terminates in a circumferentially central portion of the rearward end of the channel (36). Thus, the web (12b) provides a broken material conveying surface which communicates with the central portion of the channel (36) so as to convey broken material rearwardly out of the channel. Similarly, the web (12d) separates the flutes (14c and d) into which the channel (38) extends, which web (12d) terminates in a circumferentially central portion of the rearward end of the channel (38).

The chiselling surface of the cutting plate (6) is formed by a central dome (50) formed as a smooth elliptical projection which is positioned to coincide with the longitudinal axis of the (X) of the tool. A cutting edge (44) extends radially outwardly from the dome (50) along the two halves of the cutting plate (6). In each half of the cutting plate, the cutting edge (44) defines a boundary between a cutting face (43) and a trailing relief face (46). The cutting face (43) slopes axially rearwardly from the cutting edge (44) in a direction extending from the cutting edge (44) in the direction of rotation (R) at a first angle $\phi$ to the longitudinal axis (X) of the drilling tool. The relief face (46) slopes axially rearwardly in a direction extending from the cutting edge (44) opposite to the direction of rotation (R) at a second angle $\theta$ to the longitudinal axis of the drilling tool. The first angle $\phi$ is smaller than the second angle $\theta$. Moving outwardly from the central dome (50) the angles $\phi$ and $\theta$ of the cutting face (43) and relief face (46) increase with respect to the longitudinal axis of the drilling tool from the central region (adjacent the dome (50)) to the radially peripheral region of the cutting plate. This can be seen in FIG. 5. The increase in the angle $\theta$ is continuous along the cutting edge (44), as is the increase in the angle $\phi$.

This design of the cutting plate generates high volumes of broken material per unit time and the channels (36, 38) with each cannel feeding broken material into two flutes enables this broken material to be efficiently removed from the region of the cutting plate. Therefore, the performance of the cutting plate (6) is not unduly prejudiced by the presence of broken material.

FIGS. 7 to 12 show a second design of drilling tool according to the present invention. The second design of drilling tool is more suitable for drilling tools having smaller drilling diameters, for example in the range of 3.4 mm to 16 mm. The tool has a clamping shank portion (102) at its rearward end which can be releasably fitted within a tool holder of a rotary hammer. The tool has a drilling head (104) at its forward end within which is mounted a primary carbide cutting plate (106). The tool has an intermediate helical conveying portion (110) extending between the clamping shank portion (102) and the drilling head (104) around which extend four helical webs (112a–d) and corresponding helical flutes (114a–d). The drilling tool of FIG. 7 has a diameter $D_1$ of 5.8 mm.

Figure 7:
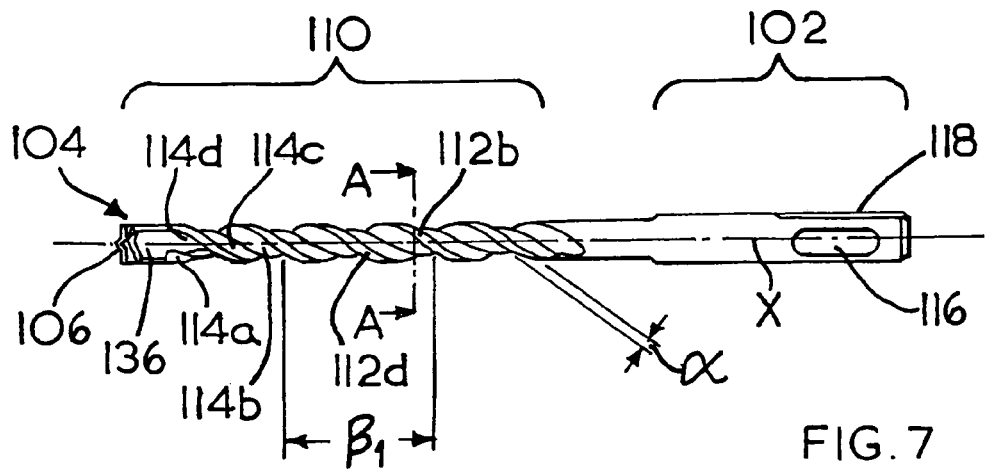
FIG. 7 shows a perspective view of a drilling tool according to a second embodiment of the present invention.
Figure 8:
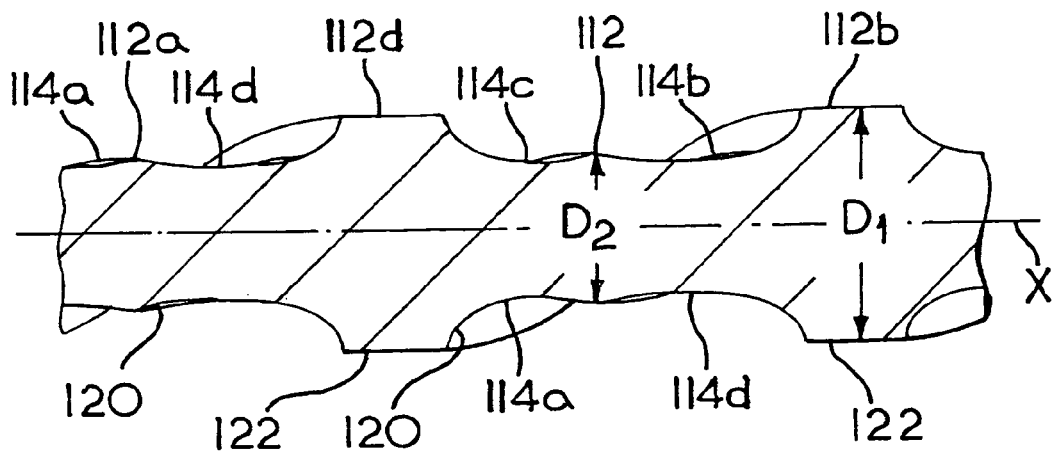
FIG. 8 shows a longitudinal cross-section through the helical conveying portion of the drilling tool of FIG. 7.
Figure 9:
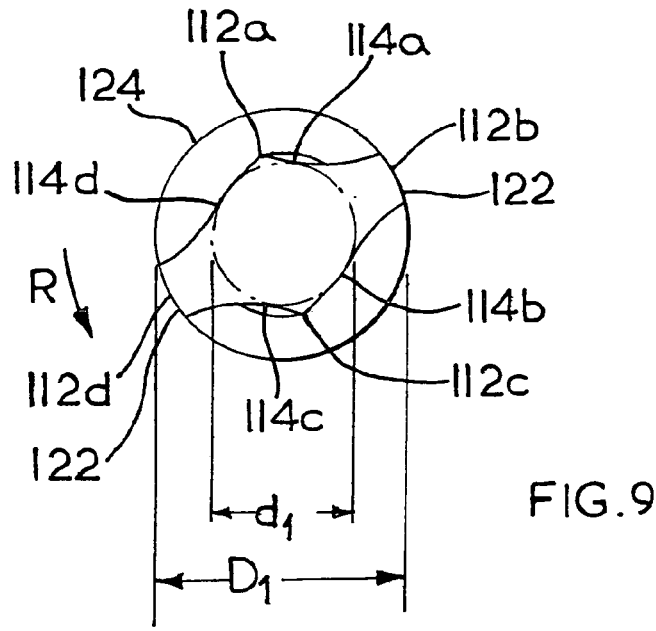
FIG. 9 shows a transverse cross-section through section A—A of FIG. 7.

The clamping shank of the tool shown in FIG. 7 is configured as an SDS-Plus clamping shank, as is well known in the art. The shank comprises a pair of opposing axially closed grooves (116) within which locking elements of a tool holder of a rotary hammer are generally received so as to enable limited reciprocation of the drilling tool with respect to the tool holder. In addition the shank is formed with two opposing axially extending slots (118) which are open at their rearward ends and which terminate at the rearward end of the shank portion (102). When the drilling tool is fitted within a tool holder of a rotary hammer corresponding splines formed on the tool holder engage in the open slots (18) to transmit rotary drive from the tool holder to the drilling tool.

The conveying helical portion (110) of the drilling tool comprises four discharge grooves or flutes (14a–d) which extend helically around the drilling tool with a pitch $\beta_1$ of 27.3 mm. Each of the flutes (14a–d) is bounded on each side by a corresponding helically extending web (12a–d). Two of the webs are formed as primary webs (112b, 122d) have a radially outwardly facing peripheral surface (122) which guide the drilling tool within the drilled hole. The diameter of the primary webs is 5.8 mm. Two of the webs are formed as auxiliary webs (112a, 112c) which come to a point at their radially outer ends. The diameter $D_2$ of the auxiliary webs is 3.8 mm or approximately 65% of the diameter of the primary webs (112b, 112d). Each of the primary and auxiliary conveying webs (112a–d) has a conveying surface (20) which faces in the direction of the clamping shank of the tool along which broken material is conveyed. The diameter $d_1$ of the bases of the flutes (114a–d) is 3.3 mm. Each of the pairs of flutes (114a and d) and (114c and b) are separated by an auxiliary web (112a, 112c) and the four flutes together extend circumferentially over 74% of the outer circumference (124) of the helical conveying portion of the drilling tool. The radially outer surface (122) of each primary web (112b, 112d) extends over 6.5% of the outer circumference (124) of the helical conveying portion of the drilling tool, which corresponds to a web width $\alpha_1$ of 1.9 mm.

Figure 10:
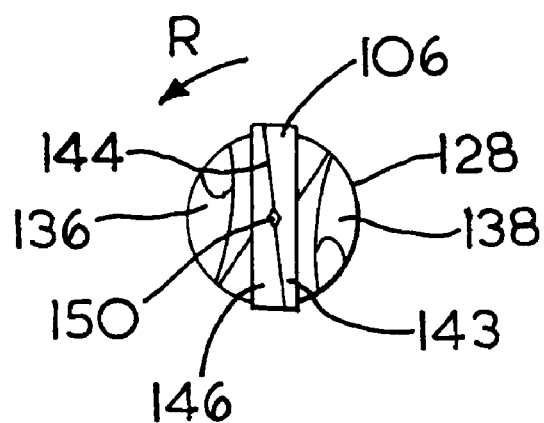
FIG. 10 shows a view of the forward end of the drilling tool of FIG. 7.
Figure 11:
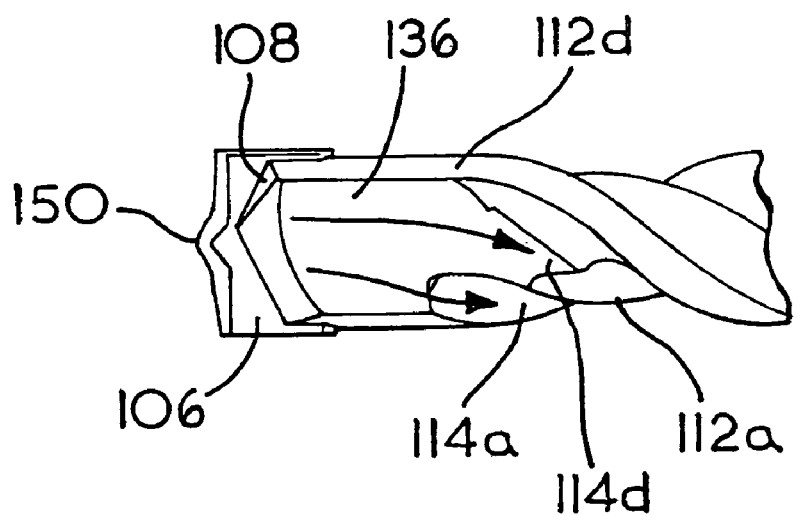
FIG. 11 shows a first perspective view of the drilling head of the drilling tool of FIG. 7.
Figure 12:
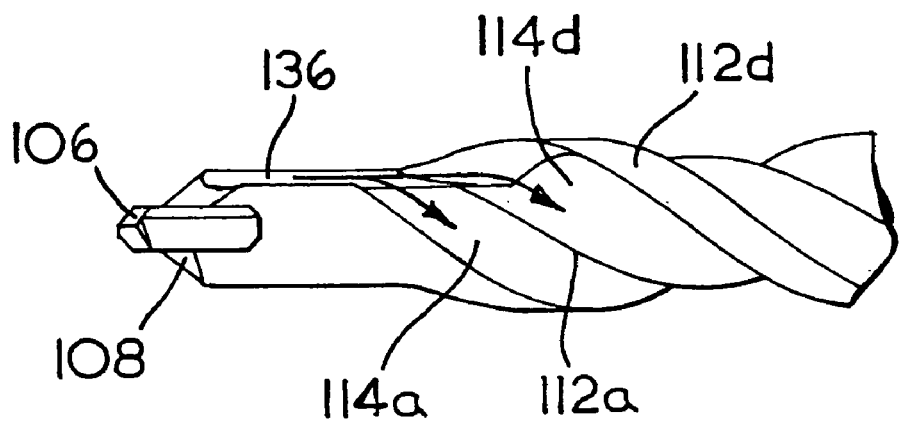
FIG. 12 shows a second perspective view of the drilling head of the drilling tool of FIG. 7.

The drilling head is best understood from FIGS. 10 to 12 and is formed with a transverse slot within which is fixed, for example by braising the carbide cutting plate (106). The drilling head has a diameter D of 5.8 mm. The cutting plate (106) extends axially beyond the forward facing face (108) of the drilling head and radially beyond both ends of the transverse slot in the drilling head to a diameter of 6.285 mm.

The two portions of the drilling head to either side of the cutting plate (106) are each formed with primary axially extending channels (136, 138). The first primary channel (136) extends from the forward facing face (108) of the drill head to the entrance to two of the four flutes (114a, 114d) and the second primary channel (138) extends from the forward facing face of the drill head to the entrance to two of the four flutes (114b, 114c). Each channel (136, 138) extends over 26% of the circumference (128) of the drilling head. This means that both channels together extend over 52% of the circumference of the drilling head, but this percentage may be varied between 34% and 70%. The diameter of the base of each channel is 3.7 mm, which is approximately 64% of the diameter of the drilling head, but this percentage may be varied within the range of 40% and 85%. Accordingly, each primary channels (136, 138) is of sufficient volume to efficiently convey broken material from the forward face of the drilling head to the entrances to the other two of the four flutes of the drilling tool. This arrangement, whereby each primary channel (136, 138) conveys broken material into two flutes, greatly improves the conveying of broken material from the forward face of the drilling head to the conveying flutes and significantly reduces the incidence of blockages and improves the ease with which the drilling tool advances into a drilled hole. The channels (136, 138) have radially outwardly facing surfaces which are parallel to the longitudinal axis (X) of the drilling tool. The circumferential positioning of the channels (136, 138) on the drilling head is selected so that each channel, as it extends axially rearwardly intersects two of the flutes (114a–d) and so extends smoothly into two of the flutes (114a–14d). The arrows in FIGS. 11 and 12 show the transportation of broken material from the primary channel (136) into the flutes (114a) and (114d).

The auxiliary web (112a) lies between the two flutes (114a and d) into which the channel (136) extends. The auxiliary web (112a) terminates in a circumferentially central portion of the channel (136). Thus, the auxiliary web (112a) provides a broken material conveying surface which communicates with the central portion of the channel (136) so as to convey broken material rearwardly out of the channel. Similarly, the web (112c) separates the flutes (114c and b) into which the channel (138) extends, which web (112c) terminates in a circumferentially central portion of the channel (138). Where there are auxiliary webs it is preferred that these are the webs that terminate in the central portion of the corresponding channel as this provides a larger volume through which broken material can pass between the channels and the associated flutes.

The cutting plate (106) is of a similar form but is of a smaller size than that described above in relation to the cutting plate (6). In particular the cutting plate (106) is formed with a central chiselling dome (150) and a pair of cutting edges (44) extending radially outwardly from the chiselling dome, with each cutting edge forming a boundary between a cutting face (143) and a trailing relief face (146) of the cutting plate and the acute angle (θ) between the relief face and the longitudinal axis of the tool increases from the radially inner to the radially outer end of each cutting edge This design of cutting plate generates high volumes of broken material per unit time and the channels (136, 138) with each cannel feeding broken material into two flutes enables this broken material to be efficiently removed from the region of the cutting plate. Therefore, the performance of the cutting plate (106) is not unduly prejudiced by the presence of broken material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A masonry or rock drilling tool suitable for use with a rotary hammer comprising:
   a drilling head at a forward end of the tool, a forwardly extending cutting plate formed with said drilling head, first and second opposing axially extending channels formed on the circumferential periphery of said drilling head;
   a clamping shank at a rearward end of the tool suitable for fitment within a tool holder of a rotary hammer;
   an intermediate helical conveying portion extending between the drilling head and the clamping shank, at least four helically extending flutes separated by corresponding helically extending webs formed on said intermediate helical conveying portion;
   a central chiselling dome and a pair of cutting edges extending radially outwardly from the chiselling dome formed on said cutting plate, each cutting edge has a trailing relief face and an acute angle between the relief face and the longitudinal axis of the tool varies from a radially inner portion to a radially outer end of each cutting edge; and
   said first axially extending channel extends axially rearwardly from a forward facing face of the drilling head into a plurality of the at least four flutes and said second axially extending channel extends axially rearwardly from the forward facing face of the drilling head into a different plurality of the at least four flutes.

2. A tool according to claim 1 wherein the acute angle increase from the radially inner to the radially outer end of each cutting edge.

3. A tool according to claim 1 wherein the web or webs that separate the pluralities of flutes each terminate at a location circumferentially central of the associated axially extending channel.

4. A tool according to claim 1 wherein there are four flutes and the first axially extending channel extends into a pair of the four flutes and the second axially extending channel extends into the remaining pair of the four flutes.

5. A tool according to claim 1 wherein the cutting plate extends transversely across the drilling head and the first channel is formed to a first side of the cutting plate and the second channel is formed to a second opposite side of the cutting plate.

6. A tool according to claim 1 wherein each cutting edge forms a boundary between a respective cutting face and a respective trailing relief face of the cutting plate.

7. A tool according to claim 6 wherein the acute angle between the cutting face and the longitudinal axis of the tool increases from the radially inner portion to the radially outer end of each culling edge.

8. A tool according to claim 1 wherein the dome is elliptical with the major axis of the elipse extending substantially parallel to the cutting edges.

9. A tool according to claim 1 wherein the two axially extending channels together extend over between 35% and 70% of the circumferential surface of the drilling head.

10. A tool according to claim 1 wherein the axially extending channels have bases with a diameter of between 40% and 85% of the diameter of the drilling head.

11. A tool according to claim 1 wherein the surfaces of the channels are substantially parallel to the longitudinal axis of the tool.

12. A tool according to claim 1 wherein the channels are concave.

13. A tool according to claim 1 wherein auxiliary cutters are fitted or formed at the forward end of the drilling head.

14. A tool according to claim 13 wherein the auxiliary cutters each trail a cutting edge of the cutting plate in the direction of rotation.

15. A tool according to claim 14 wherein an additional auxiliary axially extending channel is formed on the circumferential periphery of the drilling head between each auxiliary cutter and the cutting edge of the cutting plate trailed by said auxiliary cutter and each auxiliary channel extends axially from the forward facing face of the drill head into at least one of the at least four flutes.

16. A tool according to claim 1 wherein the at least four webs have the same diameter.

17. A tool according to claim 16 wherein each of the webs has a radially outwardly facing surface for guiding the drilling tool within a drilled hole.

18. A tool according to claim 1 wherein the at least four webs include at least two primary webs and at least two auxiliary webs of reduced diameter compared to the primary webs.

19. A tool according to claim 18 wherein the primary webs each have a radially outwardly facing surface for guiding the drilling tool within a drilled hole.

20. A tool according to claim 18 wherein the auxiliary webs come to a point at their radially outer ends.

21. A tool according to claim 18 wherein an auxiliary web separates the flutes into which each axially extending channels extend and the auxiliary web terminates in a circumferentially central portion of the corresponding channel.

22. A masonry or rock drilling tool suitable for use with a rotary hammer comprising:
   a drilling head at a forward end of the tool, a forwardly extending cutting plate fitted or formed on said drilling head, first and second opposing axially extending channels formed on the circumferential periphery of said drilling head;
   a clamping shank at a rearward end of the tool suitable for fitment within a tool holder of a rotary hammer;
   an intermediate helical conveying portion extending between the drilling head and the clamping shank, and at least four helically extending flutes separated by corresponding helically extending webs;

said first axially extending channel is concave and extends axially rearwardly from a forward facing face of the drilling head into a plurality of the at least four flutes and said second axially extending channel is concave and extends axially rearwardly from the forward facing face of the drilling head into a different plurality of the at least four flutes.

23. A tool according to claim 22 wherein the web or webs that separate the pluralities of flutes each terminate in a location circumferentially central of the associated axially extending channel.

24. A tool according to claim 22 wherein there are four flutes and the first axially extending channel extends into a pair of the four flutes and the second axially extending channel extends into the remaining pair of the four flutes.

25. A tool according to claim 22 wherein the cutting plate extends transversely across the drilling head and the first channel is formed to a first side of the cutting plate and the second channel is formed to a second opposite side of the cutting plate.

26. A tool according to claim 22 wherein the cutting plate is formed with a central chiselling dome and a pair of cutting edges extending radially outwardly from the chiselling dome, wherein each cutting edge has a trailing relief face.

27. A tool according to claim 26 wherein an acute angle between the relief face and the longitudinal axis of the tool varies, by increasing, from a radially inner portion to a radially outer end of each cutting edge.

28. A tool according to claim 26 wherein each cutting edge forms a boundary between a respective cutting face and a respective trailing relief face of the cutting plate.

29. A tool according to claim 28 wherein an acute angle between the cutting face and the longitudinal axis of the tool varies, by increasing, from a radially inner portion to a radially outer end of each cutting edge.

30. A tool according to claim 26 wherein the dome is elliptical with the major axis of the elipse extending substantially parallel to the cutting edges.

31. A tool according to claim 22 wherein the two axially extending channels together extend over between 35% and 70% of the circumferential surface of the drilling head.

32. A tool according to claim 22 wherein the axially extending channels have bases with a diameter of between 40% and 85% of the diameter of the drilling head.

33. A tool according to claim 22 wherein the surfaces of the channels are substantially parallel to the longitudinal axis of the tool.

34. A tool according to claim 22 wherein auxiliary cutters are fitted or formed at the forward end of the drilling head.

35. A tool according to claim 34 wherein the auxiliary cutters each trail a cutting edge of the cutting plate in the direction of rotation.

36. A tool according to claim 35 wherein an additional auxiliary axially extending channel is formed on the circumferential periphery of the drilling head between each auxiliary cutter and the cutting edge of the cutting plate trailed by said auxiliary cutter and each auxiliary channel extends axially from the forward facing face of the drill head into at least one of the at least four flutes.

37. A tool according to claim 22 wherein the at least four webs have the same diameter.

38. A tool according to claim 37 wherein each of the webs has a radially outwardly facing surface for guiding the drilling tool within a drilled hole.

* * * * *

UNITED STATES PATENT AND TRADEMARK OFFICE
CERTIFICATE OF CORRECTION

PATENT NO. : 7,137,461 B2
APPLICATION NO. : 10/674195
DATED : November 21, 2006
INVENTOR(S) : Markus Meierhofer It is certified that error appears in the above-identified patent and that said Letters Patent is hereby corrected as shown below:

Title Page;
Item [73] Assignee, after "Decker" delete "," (comma).

Column 10,
Line 12, "culling" should be -- cutting --.

Signed and Sealed this

Tenth Day of April, 2007

JON W. DUDAS
*Director of the United States Patent and Trademark Office*